United States Patent
Ishikawa et al.

(10) Patent No.: US 9,463,385 B2
(45) Date of Patent: Oct. 11, 2016

(54) COMPUTER-READABLE RECORDING MEDIUM HAVING OBJECT CONTROL PROGRAM STORED THEREON, OBJECT CONTROL DEVICE, AND OBJECT CONTROL METHOD

(75) Inventors: Hitoshi Ishikawa, Tokyo (JP); Masashi Kudo, Tokyo (JP); Fumito Ueda, Tokyo (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 153 days.

(21) Appl. No.: 13/491,950

(22) Filed: Jun. 8, 2012

(65) Prior Publication Data

US 2012/0322522 A1 Dec. 20, 2012

(30) Foreign Application Priority Data

Jun. 14, 2011 (JP) .................................. 2011-132040

(51) Int. Cl.
  *A63F 13/00* (2014.01)
  *A63F 13/56* (2014.01)
  *A63F 13/40* (2014.01)

(52) U.S. Cl.
  CPC ............. *A63F 13/56* (2014.09); *A63F 13/10* (2013.01); *A63F 2300/638* (2013.01)

(58) Field of Classification Search
  USPC .............................................. 463/2, 3, 40, 43
  See application file for complete search history.

(56) References Cited

U.S. PATENT DOCUMENTS

| | | | |
|---|---|---|---|
| 7,663,629 B2* | 2/2010 | Ajioka et al. | 345/473 |
| 7,878,905 B2* | 2/2011 | Weston et al. | 463/39 |
| 2002/0107591 A1* | 8/2002 | Gabai et al. | 700/94 |
| 2004/0063491 A1* | 4/2004 | Banyai et al. | 463/22 |
| 2004/0214642 A1* | 10/2004 | Beck | 463/40 |
| 2007/0078004 A1* | 4/2007 | Suzuki et al. | 463/43 |
| 2009/0158210 A1* | 6/2009 | Cheng et al. | 715/810 |
| 2010/0093255 A1* | 4/2010 | Yamamoto | 446/456 |

OTHER PUBLICATIONS

Japanese Office Action dated May 28, 2013, from corresponding Japanese Application No. 2011-132040.

(Continued)

*Primary Examiner* — Paul A D'Agostino
*Assistant Examiner* — Brandon Gray
(74) *Attorney, Agent, or Firm* — Katten Muchin Rosenman LLP (57) ABSTRACT

An object control device includes an action control unit configured to control an action of a first object, an action of a second object, and an action of an item, in a virtual space. The object control device also includes an item/object storing unit configured to store first object identification information and item identification information in association with each other, when the action control unit controls the first object to possess the item. The object control device also includes a collision determining unit configured to determine whether the item and the second object have collided. When the collision determining unit determines that the item and the second object have collided, the action control unit acquires the first object identification information stored in association with the item identification information and controls the second object to perform a first action based on the first object identification information.

11 Claims, 7 Drawing Sheets

(56) References Cited

OTHER PUBLICATIONS

Final Fantasy Tactics "Shishi-sensou" The official complete guide, Square Enix Co., Ltd. pp. 204-207 of First Edition, Jun. 28, 2007.

Monster Hunter 2(dos), Lightning Play Station, Media Works, Inc. p. 96 of Issue 22 of vol. 12, Jun. 23, 2006.

Ragnarok Online, "Cho-sugoi-koryaku-yattemasu" Futabasha Publishers Ltd., p. 31 of first edition, Dec. 30, 2005.

\* cited by examiner

| ITEM ID | MASS INFORMATION | SIZE INFORMATION | POSITIONAL INFORMATION |
|---|---|---|---|
| I1 | 2 | 3 | $(x_1, y_1, z_1)$ |
| I2 | 3 | 1 | $(x_2, y_2, z_2)$ |
| ⋮ | ⋮ | ⋮ | ⋮ |

COMPUTER-READABLE RECORDING MEDIUM HAVING OBJECT CONTROL PROGRAM STORED THEREON, OBJECT CONTROL DEVICE, AND OBJECT CONTROL METHOD

CROSS-REFERENCE TO RELATED APPLICATION

The present application claims priority from Japanese application JP 2011-132040, the content of which is hereby incorporated by reference into this application.

BACKGROUND OF THE INVENTION

1. Field of the Invention

The present invention relates to a computer-readable recording medium having an object control program stored thereon, an object control device, and an object control method.

2. Description of the Related Art

There is a known game, in which an object to be operated is moved in response to an instruction operation performed by a player so as to make an action such as an attack to another object. Specifically, for example, in the game, a character to be operated is moved in a virtual space and fights against an opponent character encountered by the character to be operated.

SUMMARY OF THE INVENTION

In the virtual space realized by such a game program as described above, for example, one or more of character(s) to be operated possess(es) an item, such as a pike, an arrow, or a ball, and attack (s) the opponent character by performing an action such as throwing the predetermined item to the opponent character in some cases. However, when the item released by the character collides against the opponent character, it may not be determined which character has released the item in some cases. As a result, in such cases, the opponent character cannot be operated to perform an action such as an attack to the character.

In view of the above-mentioned problem, one or more embodiments of the present invention realizes an object control program, a computer-readable recording medium having the object control program stored thereon, an object control device, and an object control method, which identify a character that has made an attack using an item when, for example, the item collides against an opponent character so that the opponent character is controlled to perform a predetermined action (for example, an attack, positional movement, or the like) with respect to the character that has made the attack.

According to an exemplary embodiment of the present invention, an object control device includes an action control unit configured to control an action of a first object, an action of a second object, and an action of an item, in a virtual space, an item/object storing unit configured to store first object identification information for identifying the first object and item identification information for identifying the item in association with each other, when the action control unit controls the first object to possess the item, and a collision determining unit configured to determine whether the item and the second object have collided in the virtual space. When the collision determining unit determines that the item and the second object have collided, the action control unit acquires the first object identification information stored in association with the item identification information from the item/object storing unit and controls the second object to perform a first action based on the first object identification information.

According to an exemplary embodiment of the present invention, there is provided a non-transitory computer-readable recording medium having an object control program stored thereon for causing a computer to function as an action control unit configured to control an action of a first object, an action of a second object, and an action of an item in a virtual space, an item/object storing unit configured to store first object identification information for identifying the first object and item identification information for identifying the item in association with each other, when the action control unit controls the first object to possess the item, and a collision determining unit configured to determine whether the item and the second object have collided in the virtual space. When the collision determining unit determines that the item and the second object have collided, the action control unit acquires the first object identification information stored in association with the item identification information from the item/object storing unit and controls the second object to perform a first action based on the first object identification information.

According to an exemplary embodiment of the present invention, an object control method includes controlling an action of a first object, an action of a second object, and an action of an item in a virtual space, storing first object identification information for identifying the first object and item identification information for identifying the item in association with each other, when the first object is controlled to possess the item, determining whether the item and the second object have collided in the virtual space. When it is determined that the item and the second object have collided, acquiring the first object identification information stored in association with the item identification information and controlling the second object to perform a predetermined action based on the first object identification information.

DETAILED DESCRIPTION OF THE INVENTION

Hereinafter, an embodiment of the present invention is described with reference to the drawings. Note that, in the drawings, the same or similar components are denoted by the same reference symbols, and overlapping description thereof is omitted.

Figure 1:
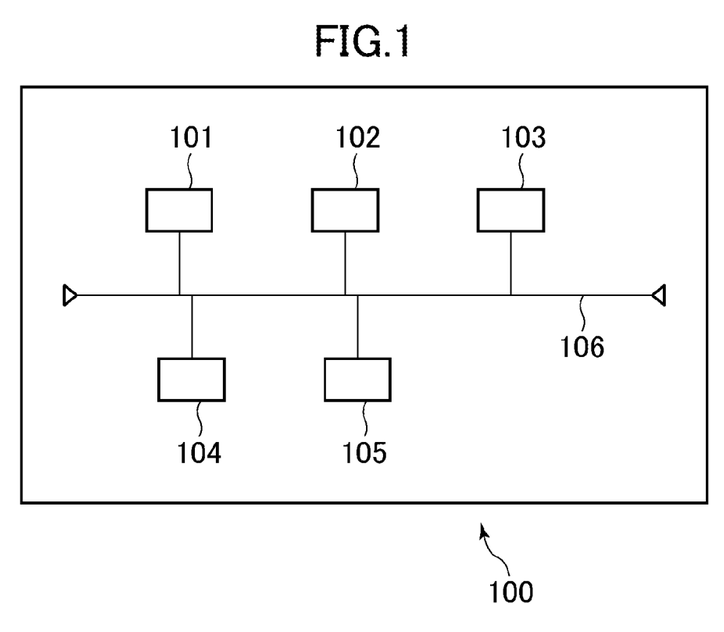
FIG. 1 is a diagram for illustrating an overview of a configuration of an object control device according to an embodiment of the present invention.

FIG. 1 is a diagram for illustrating an overview of a configuration of an object control device according to the embodiment of the present invention. As illustrated in FIG. 1, an object control device 100 includes, for example, a computer configured by a CPU and a memory. The object control device 100 includes, for example, a control unit 101, a storage unit 102, a communication unit 103, an operation unit 104, and a display unit 105. The control unit 101, the storage unit 102, the communication unit 103, the operation unit 104, and the display unit 105 are connected to each other by an internal bus 106.

The control unit 101 is, for example, a CPU, an MPU, or the like and operates in accordance with programs stored in the storage unit 102. The storage unit 102 includes an information recording medium such as a ROM, a RAM, or a hard disk and is an information recording medium for storing the programs to be executed by the control unit 101. The storage unit 102 also operates as a work memory of the control unit 101. The programs may be downloaded through, for example, a network (not shown) so as to be provided or may be provided by various types of computer-readable information recording mediums such as a CD-ROM or a DVD-ROM.

The communication unit 103 connects the object control device 100 to another terminal device (not shown), a database (not shown), or the like through the network (not shown). The operation unit 104 includes, for example, a keyboard, a mouse, or a controller, and outputs the contents of an instruction operation by a user to the control unit 101 in accordance with the instruction operation. The display unit 105 is, for example, a liquid crystal display, an organic EL display, or the like, and displays information in accordance with an instruction from the control unit 101. The configuration of the object control device 100 described above is merely an example and is not limited thereto. For example, the object control device 100 may be configured so that the instruction operation of the user may be input from the terminal device to the object control device 100 through the network.

Figure 2:
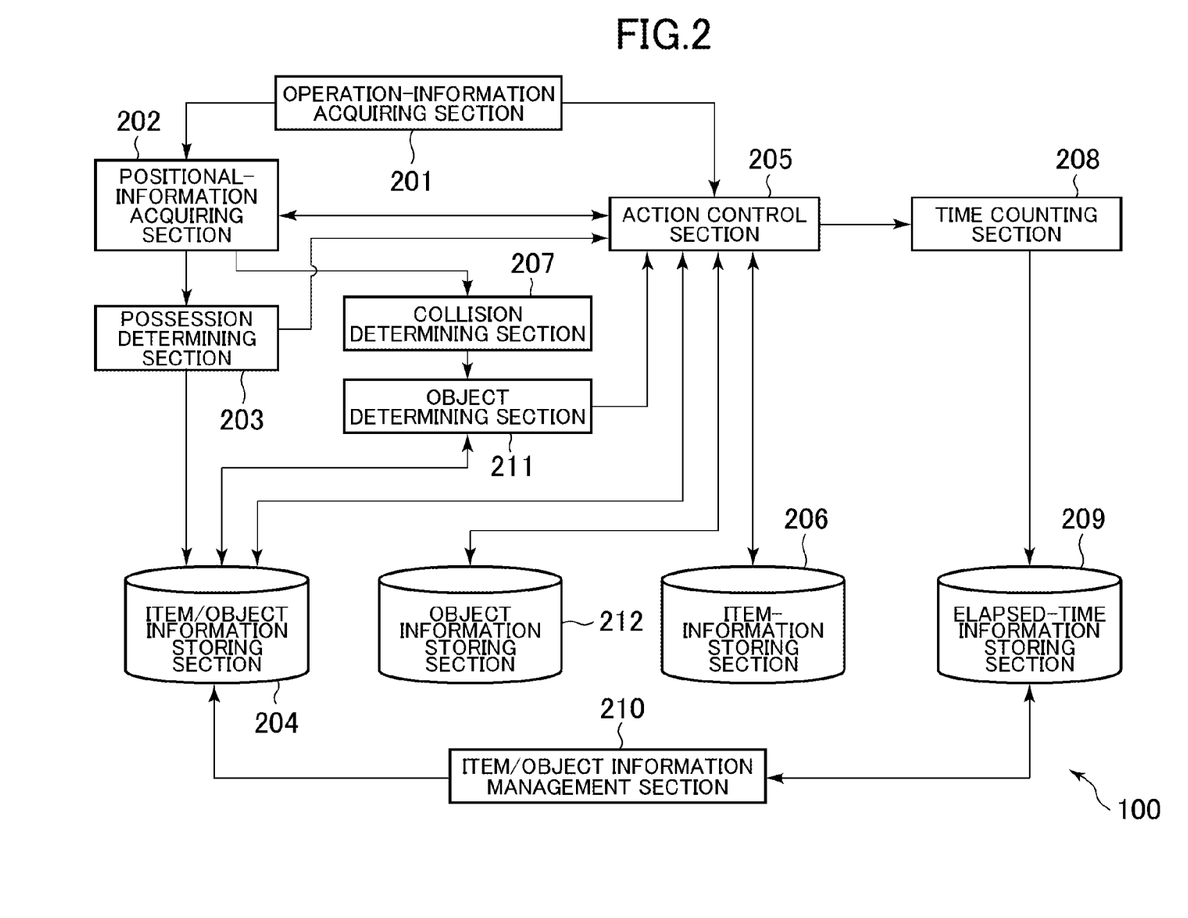
FIG. 2 is a diagram for illustrating a functional configuration of the object control device illustrated in FIG. 1.

FIG. 2 is a diagram for illustrating a functional configuration of the object control device illustrated in FIG. 1. FIG. 2 mainly illustrates the functional configuration relating to one or more embodiments of the present invention among the functions realized by the object control device 100. As illustrated in FIG. 2, the object control device 100 includes an operation-information acquiring section 201, a positional-information acquiring section 202, a possession determining section 203, an item/object information storing section 204, an action control section 205, an item-information storing section 206, a collision determining section 207, a time counting section 208, an elapsed-time information storing section 209, an item/object information management section 210, an object determining section 211, and an object information storing section 212.

The operation-information acquiring section 201 acquires various types of operation information for controlling an a character to be operated (operated object). The operation information is input by, for example, the user using the keyboard or the controller corresponding to the operation unit 104. When the object control device 100 is connected to the terminal device or the like through the network, the operation instruction may be input from an operation unit of the terminal device.

Specifically, the operation information includes, for example, operation information for an item possession instruction, a positional-movement instruction, and an attack instruction. Here, the item possession instruction corresponds to, for example, an instruction issued to the operated object to possess the item. The attack instruction corresponds to, for example, an instruction issued to the operated object to attack an opponent character (non-operated object which is not operated by the user) by using the possessed item. The positional-movement instruction corresponds to, for example, an instruction for moving the operated object in a virtual space and includes, for example, an instruction of positional movement in an upward, downward, rightward, or leftward direction. In response to the positional-movement instruction, the operated object moves in the virtual space. The item corresponds to an object different from the operated object and the non-operated object described below, such as a pike, an arrow, a sword, a ball, or a box displayed in the virtual space. Further, the attack instruction corresponds to, specifically, for example, an instruction to throw or launch the item such as the pike, the arrow, or the sword toward the opponent character.

Figure 3:
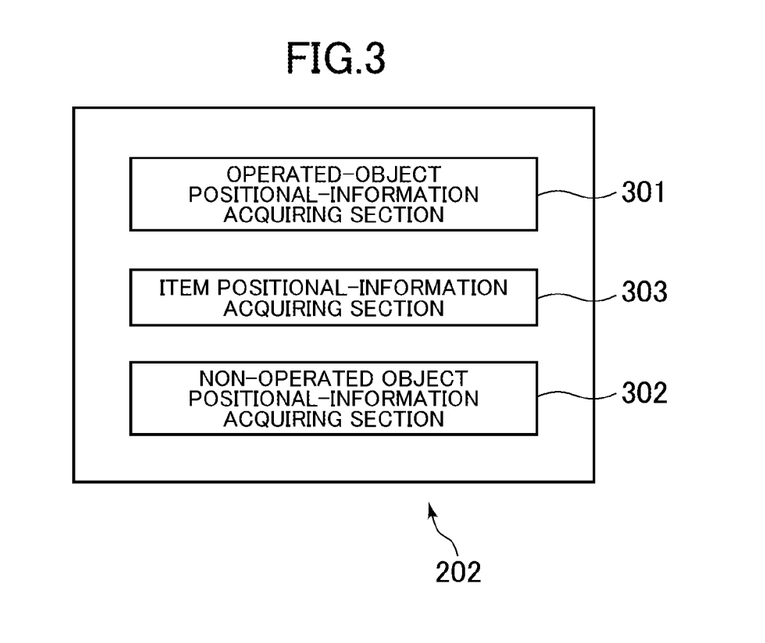
FIG. 3 is a diagram for illustrating a functional configuration of a positional-information acquiring section illustrated in FIG. 2.

The positional-information acquiring section 202 acquires positional information indicating the positions of the operated object, the item, and the non-operated object in the virtual space. Specifically, as illustrated in FIG. 3, the positional-information acquiring section 202 includes an operated-object positional-information acquiring section 301, a non-operated object positional-information acquiring section 302, and an item positional-information acquiring section 303.

The operated-object positional-information acquiring section 301 acquires positional information of the operated object in the virtual space. The item positional-information acquiring section 303 acquires positional information of the item in the virtual space. The non-operated object positional-information acquiring section 302 acquires positional information of the non-operated object in the virtual space. Specifically, for example, each positional information described above is acquired as three-dimensional space coordinates indicating the positions of the item, the operated object, or the non-operated object in the virtual space.

The possession determining section 203 determines whether or not the operated object is able to possess the item when the operation-information acquiring section 201 acquires an item possession instruction. Specifically, for example, when the operation-information acquiring section 201 acquires the item possession instruction, the possession determining section 203 instructs the operated-object positional-information acquiring section 301 to acquire the positional information of the operated object. The possession determining section 203 instructs the item positional-information acquiring section 303 to acquire the positional information of the item. Then, the possession determining section 203 determines whether or not the acquired positional information of the operated object and the acquired positional information of the item are present within a predetermined range. The possession determining section 203 determines that the operated object is able to possess the item when it is determined that both positional information are present within the predetermined range, and determines that the operated object is not able to possess the item when it is determined that both positional information is not present within the predetermined range.

Figure 4:
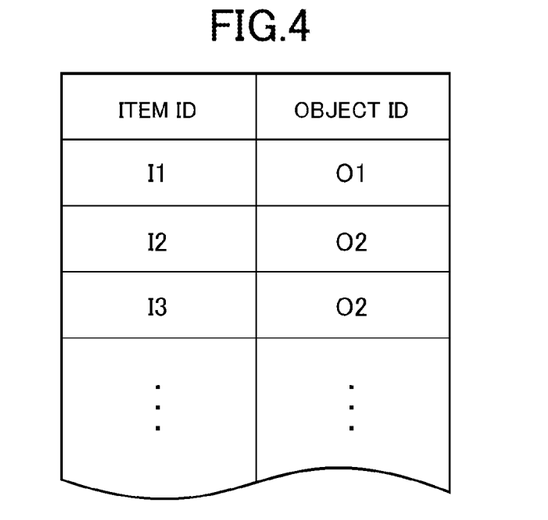
FIG. 4 is a table for illustrating a storage format of an item/object information storing section illustrating in FIG. 2.

When the possession determining section 203 determines that the operated object is able to possess the item, the item/object information storing section 204 stores item identification information (ID) for identifying the item and object identification information (ID) for identifying the operated object in association with each other. Specifically, for example, as shown in FIG. 4, the item/object information storing section 204 stores an object ID of O1 for an item ID of I1 and an object ID of O2 for an item ID of I2 in a table format.

Figure 5:
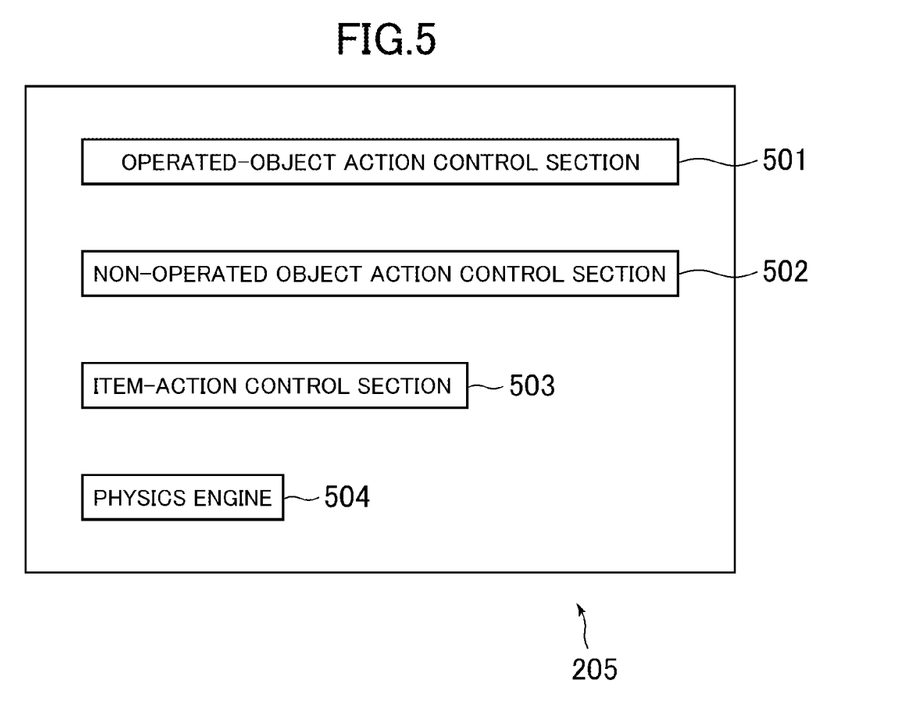
FIG. 5 is a diagram for illustrating a functional configuration of an action control section illustrated in FIG. 2.

The action control section 205 controls actions of a plurality of objects in the virtual space. The plurality of objects correspond to, for example, one or more character(s) operated by one or more user(s), one or more opponent character(s) corresponding to an opponent (s) to the one or more character (s) operated by the user (s), and an item which may be possessed or used by the character (s) operated by the user(s). Specifically, for example, the action control section 205 includes, as illustrated in FIG. 5, an operated-object action control section 501, a non-operated object action control section 502, an item-action control section 503, and a physics engine 504.

The operated-object action control section 501 controls the action of the one or more operated object(s) (for example, a character(s) operated by the user). Specifically, for example, when the possession determining section 203 determines that the operated object is able to possess the item, the operated-object action control section 501 controls the operated object to perform a predetermined possession action (second action). The possession action is performed, for example, by using motion data stored for each object ID in association with each action in the object information storing section 212. The possession action is, for example, an action of picking up a pike or an arrow when the item is the pike or the arrow on the ground in the virtual space and may be configured so that the operated object is controlled to perform different actions for each item or each position of the item. The operated-object action control section 501 also moves the operated object in the virtual space in response to a positional-movement instruction acquired by the operation-information acquiring section 201.

The item-action control section 503 controls the positional movement or display of the item. Specifically, for example, when the operation-information acquiring section 201 acquires the attack instruction, the item-action control section 503 acquires item information described below from the item-information storing section 206 described below and transmits the item information to the physics engine 504. Then, as described later, the item-action control section 503 acquires the positional information of the item from the physics engine 504 for each predetermined period, for example, for one frame period and moves the item in the virtual space in accordance with the positional information of the item. Moreover, the item-action control section 503 updates item positional information stored in the item-information storing section 206 as described below with the positional information of the item, which is acquired from the physics engine 504.

Figure 6:
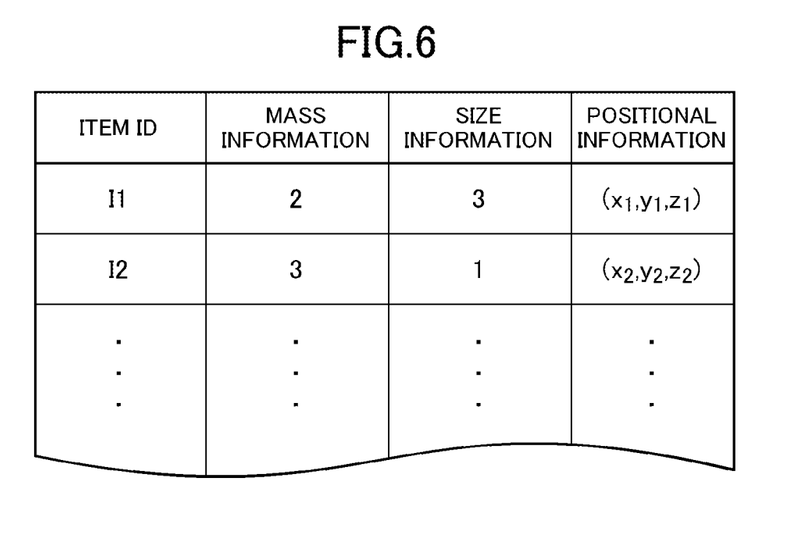
FIG. 6 is a table for illustrating a storage format of an item-information storing section illustrated in FIG. 2.

The item-information storing section 206 stores, for example, the item identification information (ID) for identifying the item, mass information indicating a mass of the item, size information indicating a size of the item, the item positional information indicating the position of the item, and the like in association with each other. Those pieces of information correspond to the item information described above. Specifically, as shown in FIG. 6, the item-information storing section 206 stores "2" as the mass information, "3" as the size information, and "$(x_1, y_1, z_1)$" as the item positional information in association with each other for the item with the item ID of I1. The item positional information is updated for each predetermined period with the positional information of the item, which is acquired from the physics engine 504 described below. The mass, the size, and the like are merely exemplary. Besides, the item information may include information regarding a shape of the item and an image ID for identifying an image of the item.

The physics engine 504 calculates, for example, a speed of the item after the issuance of the attack instruction in accordance with the acquired item information or attack instruction described above to calculate the positional information for each predetermined period. Therefore, for example, when the attack instruction is, for example, throwing the pike as the item, a simulation is performed so that the pike falls earlier as the mass information of the pike is larger. Moreover, when the physics engine 504 is designed so that the attack instruction to throw the pike is input by an analog value, the positional information of the item after issuing the attack instruction is obtained for each predetermined period in accordance with the law of classical dynamics. Thus, for example, the speed of the pike after issuing the attack instruction becomes higher as the pike is thrown with a stronger force (for example, as the analog value becomes larger).

The physics engine 504 corresponds to known computer software which simulates the law of classical dynamics, for example, the mass, the speed, a friction, and a wind. Therefore, the detailed description thereof is herein omitted. Although the case where the physics engine 504 is used for simulating the item has been described above, the action of the non-operated object or the operated object may also be simulated by using the physics engine 504 so that the result of simulation is used to control the action of the operated object or the like in a predetermined case.

The collision determining section 207 determines whether or not the item and the non-operated object have collided based on the acquired positional information of the item and positional information of the non-operated object. For the determination of the collision, for example, a so-called separating axis test is used. According to the separating axis test, it is determined whether or not a separable plane (separating plane) is present between two objects in the virtual space. When the separating plane is not present between the two objects, it is determined that the two objects collide. The determination of collision using the separating axis test is known and therefore, the details thereof are herein omitted. Besides the separating axis test, other collision determination methods such as a GJK method may be used as the collision determination method.

When the collision determining section 207 determines that the item and the non-operated object have collided, the object determining section 211 determines whether or not the item ID of the item, which is determined to have collided, and the object ID, which is stored in association with the item ID, are stored in the item/object information storing section 204.

The non-operated object action control section 502 controls the action of the non-operated object (for example, the opponent character). Specifically, for example, when the object determining section 211 determines that the item ID of the item that has collided is stored, the object ID stored in association with the item ID of the item, which is determined to have collided, is acquired from the item/object information storing section 204. In this manner, the non-operated object action control section 502 can recognize which object has made the attack. Specifically, the non-operated object action control section 502 can recognize from which object the item having collided against the non-operated object is released.

Then, the non-operated object action control section 502 controls the non-operated object to perform a predetermined action (first action) based on the acquired object ID. Here, the predetermined action corresponds to an action based on the object (for example, the operated character operated by a certain user) identified by the acquired object ID. More specifically, the predetermined action is a preset action based on the acquired object ID, for example, turning toward the object, moving toward the object, starting the attack action to the object, and the like.

When the object determining section 211 determines that the item ID of the item which has collided is not stored, a predetermined time period has elapsed after the item identified by the item ID was released by the operated object and, for example, the item is now present on the ground as described below. Therefore, for the collision against the item, the non-operated object is not controlled to perform the preset action based on the acquired object ID. In this case, another action, for example, an action irrelevant to the operated character such as a stumble over the item may be performed. As a result, for example, when the item, which has been thrown by the operated character and is now present on the ground, and the opponent character come into contact with each other (collide) in the virtual space, the opponent character can be prevented from regarding a character, which has previously thrown the item, as an opponent and attacking the character.

The time counting section 208 counts a time period (elapsed time) after the item possessed by the operated object is released from the operated object in response to the attack instruction. Specifically, for example, the time counting section 208 may count a time period after the operation-information acquiring section 201 acquires the attack instruction or may count a time period after the operate-object action control section 501 terminates a predetermined action based on the attack instruction. Further, the time counting section 208 may count a time period based on a time at which the item possession instruction is acquired, depending on the type of attack.

Figure 7:
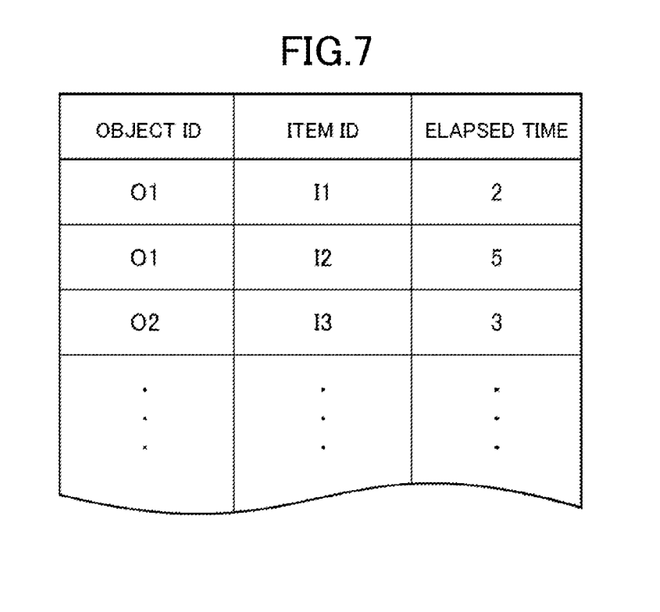
FIG. 7 is a table for illustrating a storage format of an elapsed-time information storing section illustrated in FIG. 2.

The elapsed-time information storing section 209 stores the elapsed time counted by the time counting section 208, for example, as shown in FIG. 7, in a table format for each object ID of the operated object and each item ID. Information on the elapsed time stored for each object ID and each item ID is referred to as elapsed-time information. For example, in FIG. 7, for an object ID of O1, I1 is stored as the item ID, whereas "2" is stored as the elapsed time. Therefore, the table shows that the operated object with the object ID of O1 makes an attack using the item with the item ID of I1 and the elapsed time of 2 (for example, two seconds) has elapsed after the item was released from the operated object. The elapsed time is updated for each predetermined period (for example, for each second). Each of the object ID and the item ID is acquired from, for example, the action control section 205 through an intermediation of the time counting section 208.

When the elapsed-time information stored in the elapsed-time information storing section 209 indicates a predetermined elapsed time (for example, ten seconds) or longer, the item/object information management section 210 erases the item information for the item ID, for which the elapsed time becomes equal to or longer than the predetermined elapsed time, from the item/object information storing section 204. In this manner, as described above, for example, when the item, which was thrown by the operated character and is now on the ground, and the opponent character come into contact with each other (collide) in the virtual space, the opponent character can be prevented from regarding the character which has previously thrown the item as an opponent and attacking the character. Further, when a time period counted by the time counting section 208 becomes equal to or longer than the predetermined elapsed time, the item/object information management section 210 erases the elapsed-time information for the item ID, for which the counted time period becomes equal to or longer than the predetermined elapsed time.

The configuration of the object control device 100 described above is merely an example and is not limited thereto. For example, the configuration of the object control device 100 may be replaced by substantially the same configuration as that described above, a configuration having the same operations and effects, or a configuration achieving the same object. For example, the predetermined elapsed time may be set so as to be different for each object ID, each item ID, and each type of attack. For example, in the case of an attack using a so-called trap, specifically, in the case where an item is placed at an arbitrary location and a predetermined attack is made when the opponent character comes into contact with the item, the predetermined time may be set longer. The elapsed-time information may be erased when it is determined that the item and the non-operated object have collided as described below. In this case, for example, when a plurality of non-operated objects are present and when the item sequentially collides against the plurality of non-operated objects, the relating elapsed-time information may be erased after the item collides against all the plurality of non-operated objects without erasing the relating elapsed-time information when the item collides against a first one of the non-operated objects. In this case, the elapsed-time information may be erased when it is determined that the item collides against the first non-operated object in a predetermined case.

Figure 8:
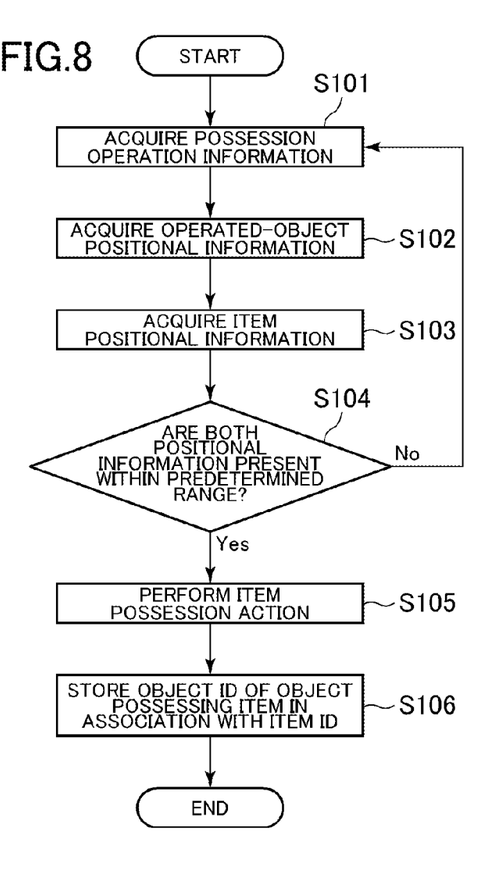
FIG. 8 is a flowchart for illustrating a flow of processing relating to possession of an item.

Next, a flow of processing of the object control device 100 is described. First, a flow of processing relating to the possession of the item is described. FIG. 8 is a flowchart for illustrating the flow of the processing relating to the possession of the item. As a specific example, the case where the object ID of the operated object is O1 is described below.

As illustrated in FIG. 8, for example, in response to input of the item possession instruction to the operation unit 104 by the user, the operation-information acquiring section 201 acquires the item possession instruction (possession operation information) (S101). Then, the operated-object positional-information acquiring section 301 acquires the positional information of the operated object at the time of acquisition of the item possession instruction from the operated-object action control section 501 (S102).

Then, the item positional-information acquiring section 303 acquires the positional information of the item at the time of acquisition of the item possession instruction, from the item-information storing section 206 (S103). In the case where a plurality of the items are present in this step, the positional information of one of the items, which is the closest to the positional information of the operated object acquired in Step S102, is acquired. Specifically, in the case where the item information stored in the item-information storing section 206 is as shown in FIG. 6 and where the positional information of the item with the item ID of I1 is closer to the acquired positional information of the operated object compared with the positional information of the item with the item ID of I2, the positional information of the item with the item ID of I1 is acquired together with the item ID of I1.

The possession determining section 203 determines whether or not the positional information of the operated object acquired in Step S102 and the positional information of the item acquired in Step S103 are present within a predetermined range. When determining that both positional information are present within the predetermined range, the possession determining section 203 determines that the operated object can possess the item (S104). Then, the processing proceeds to Step S105. On the other hand, when it is determined that both positional information are not present within the predetermined range, the processing returns to Step S101. The predetermined range is preset as a range in which the operated object can naturally possess the item. The predetermined range may be set so as to be different for each operated object or each item.

When the possession determining section 203 determines that the operated object can possess the item, the operated-object action control section 501 controls the operated object to perform the action of possessing the item (S105). The possessing action is performed by, for example, using motion data stored in the object information storing section 212 as described above.

Then, the item/object information storing section 204 stores the item ID of the item and the object ID for identifying the operated object in association with each other (S106). Specifically, in the case of the above-mentioned example, for example, as shown in FIG. 4, the item ID of I1 and the operated object ID of O1 are stored in association with each other in the item/object information storing section 204. Then, the processing is terminated.

Figure 9:
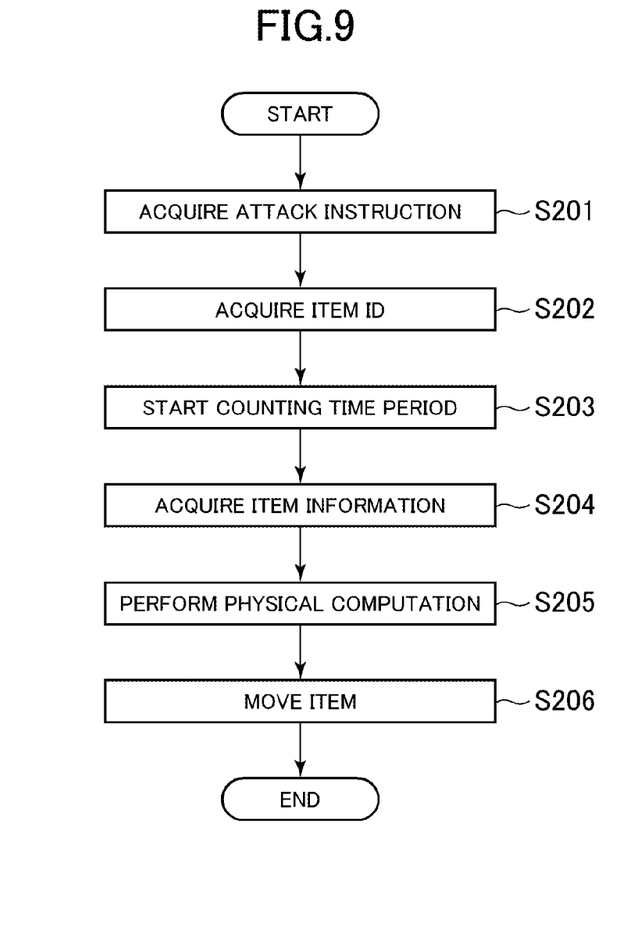
FIG. 9 is a flowchart for illustrating a flow of processing performed when an operated object attacks a non-operated object.

Next, a flow of processing performed when the operated object uses the possessed item to attack the non-operated object is described. FIG. 9 is a flowchart for illustrating the flow of the processing performed when the operated object attacks the non-operated object. As illustrated in FIG. 9, for example, when the user inputs the attack instruction to the operation unit 104, the operation-information acquiring section 201 acquires the attack instruction (S201).

When the operation-information acquiring section 201 acquires the attack instruction, the item-action control section 503 refers to the item/object information storing section 204 to acquire the item ID stored in association with the operated object ID of the target object to be operated (S202). For example, in the case of the above-mentioned example, the object ID of the target object to be operated is O1. Referring to FIG. 4, the item ID of I1 is stored in association with the operated object ID of O1. Therefore, the item ID of I1 is acquired.

At this time, the time counting section 208 starts counting a time period and stores the elapsed time together with the object ID of the target object to be operated and the item ID in the elapsed-time information storing section 209 (S203). The elapsed time stored in the elapsed-time information storing section 209 is updated by the time counting section 208 for each predetermined time.

Then, the item-action control section 503 acquires the item information for the item ID from the item-information storing section 206 based on the item ID and transmits the item information to the physics engine 504 (S204). For example, in the case of the above-mentioned example, as shown in FIG. 6, the item information such as the mass information, the size information, and the positional information, which is stored in association with the item ID of I1, is transmitted to the physics engine 504.

The physics engine 504 performs a physical computation based on the item information so as to calculate the positional information of the item for a predetermined period, for example, for one frame period, in the virtual space (S205). The item-action control section 503 moves the item in the virtual space based on the positional information of the item, which is calculated by the physics engine 504 (S206). Then, the processing is terminated.

Figure 10:
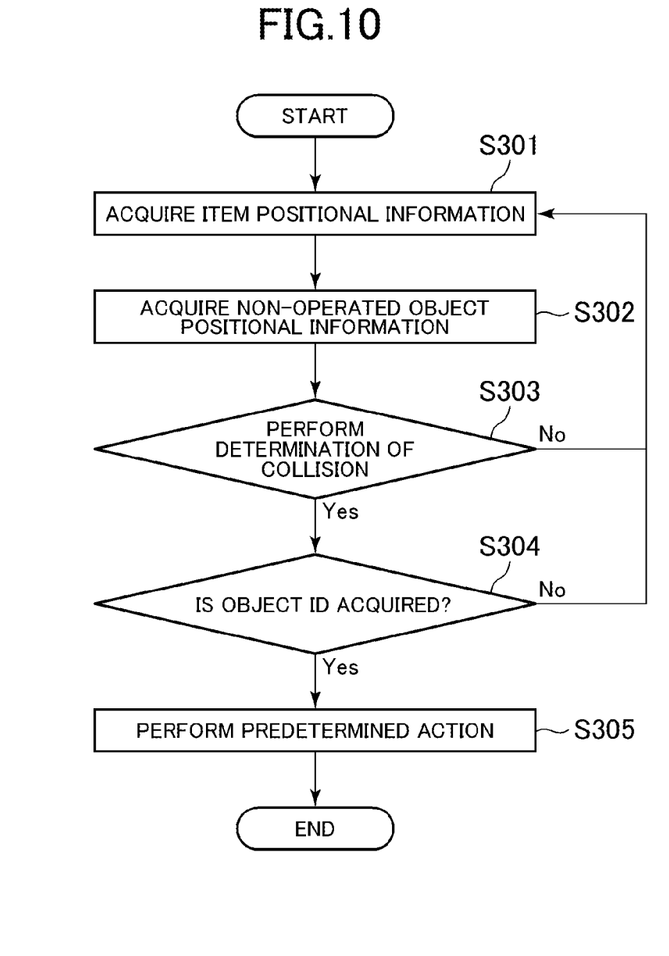
FIG. 10 is a flowchart for illustrating a flow of processing including determination of collision between the item and the non-operated object.

Next, a flow of processing for determining the collision between the item and the non-operated object and a flow of processing at the time of collision are described referring to FIG. 10. As illustrated in FIG. 10, first, the item positional-information acquiring section 303 acquires the positional information of the item (S301). The item positional-information acquiring section 303 may acquire the item positional information stored in the item-information storing section 206 or may acquire the positional information of the item which is calculated by the physics engine 504. Then, the non-operated object positional-information acquiring section 302 acquires the positional information of the non-operated object (S302). The positional information of the non-operated object is acquired from, for example, the non-operated object action control section 502.

The collision determining section 207 determines whether or not the item and the non-operated object have collided based on the acquired positional information of the item and the acquired positional information of the non-operated object (S303). For the determination of the collision, for example, the separating axis test is used as described above.

When the collision determining section 207 determines that the item and the non-operated object have collided, the object determining section 211 then determines whether or not the object ID is stored in association with the item ID of the item which is determined to have collided against the non-operated object in the item/object information storing section 204. When it is determined that the object ID is stored, the object ID is acquired (S304). For example, in the case of the above-mentioned example, the object ID of O1 is stored in association with the item ID of I1, as shown in FIG. 4. Therefore, the object ID of O1 is acquired. As a result, the object which has made the attack or the like is recognized as the object identified by the object ID of O1.

On the other hand, in this step, when a time period elapsed after the start of the attack using the item becomes equal to or longer than the predetermined time, as described above, the item ID for identifying the item and the object ID associated with the item ID are erased by the item/object information management section 210. Therefore, the processing returns to Step S301. As a result, for example, in the case where a time period elapsed after the pike corresponding to the item was thrown by the operated object is equal to or longer the predetermined time and the pike is now on the ground in the virtual space, even when it is determined that the pike on the ground and the non-operated object have collided, an attack to the operated object can be prevented from being started by the non-operated object in Step S305.

The non-operated object action control section 502 controls the non-operated object to perform a predetermined action for the operated object identified by the object ID acquired in Step S304 (S305). As described above, the predetermined action is a preset action for the object identified by the acquired object ID, for example, an action of turning toward the object, an action of moving toward the object, or an action of starting the attack action to the object. Then, the processing is terminated.

Figure 11A:
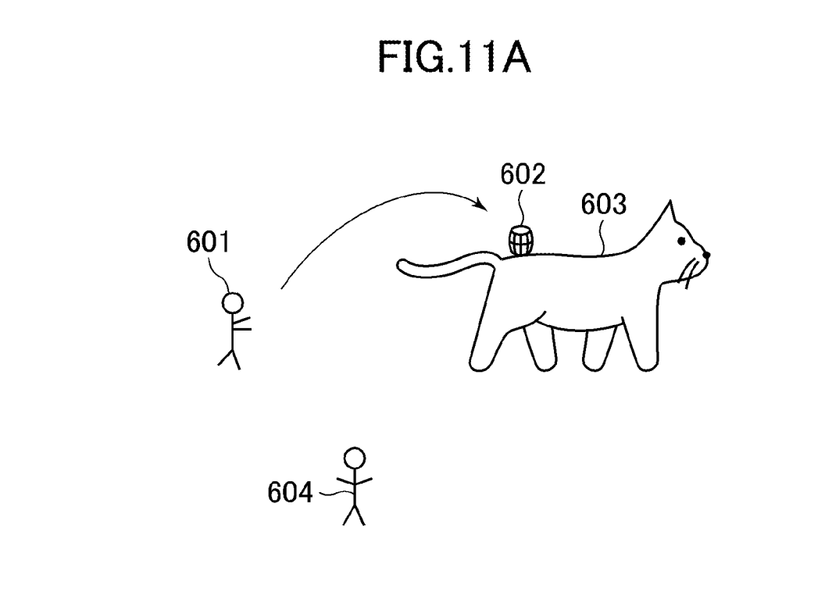
FIGS. 11A and 11B are views for illustrating a specific example of the embodiment of the present invention.
Figure 11B:
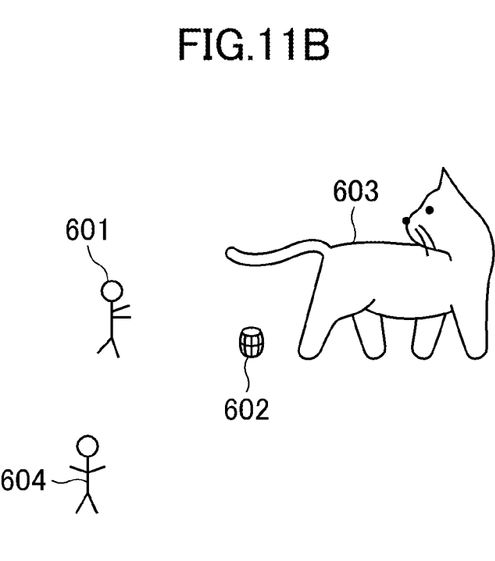

Next, the flow of the processing described above is described with a specific example illustrated in FIGS. 11A and 11B. FIG. 11A illustrates a state in which an operated object 601 makes an attack by throwing an item 602 to a non-operated object 603 and the item 602 collides against the non-operated object 603 in the virtual space that is realized by the object control device 100. FIG. 11B illustrates a state in which the item 602 has collided against the non-operated object 603 and then, the non-operated object 603 turns the head toward the operated object 601 which has made the attack using the item 602. The virtual space may be configured to be, for example, displayed on the display unit 105 or transmitted to an external terminal device through an intermediation of the communication unit 103 so as to be displayed on a display unit of the terminal device.

As described above, at the time illustrated in FIG. 11A, the operated object ID for identifying the operated object 601 is stored in association with the item ID for identifying the item 602 in the item/object information storing section 204. When the item 602 and the non-operated object 603 collide, the operated object ID indicating the operated object 601 (corresponding to the operated object which has made the attack) is acquired.

Then, at the time illustrated in FIG. 11B, the object ID indicating the operated object 601 is acquired. Based on the acquired object ID, the non-operated object action control section 502 controls the non-operated object 603 to perform the predetermined action (in this case, action of turning the head). In this manner, the non-operated object action control section 502 can recognize which of the operated object 601 and an operated object 604 has made the attack. As a result, the non-operated object action control section 502 can control the non-operated object 603 to perform the predetermined action for the operated object which has made the attack (the operated object 601 in this case).

The present invention is not limited to the embodiment described above, and various modifications can be made thereto. For example, the configuration of the object control device 100 can be replaced by substantially the same configuration as that described above, a configuration having the same operations and effects, or a configuration achieving the same object.

Specifically, for example, each of the number of operated objects, the number of non-operated objects, and the number of items is not limited to the number described above, and may be two or more, that is, plural. In this case, the plurality of operated objects may be operated by one or more users. The plurality of non-operated objects may be independently controlled by the non-operated object action control section 502. Moreover, although the description is given above using the operated object and the non-operated object, the operated object is not necessarily required to operate based on the instruction of the user and may be configured so as to act in accordance with a preset program or the like, without the instruction of the user, as in the case of the non-operated object as explained above. In addition, for example, a first object recited in the claims includes the operated object, and a second object recited in the claims includes the non-operated object.

What is claimed is:

1. An object control device, comprising:
   an action control unit configured to control an action of a first object, an action of a second object, and an action of an item, in a virtual space;
   an item/object storing unit configured to store first object identification information for identifying the first object and item identification information for identifying the item in association with each other, when the action control unit controls the first object to possess the item; and
   a collision determining unit configured to determine whether the item and the second object have collided in the virtual space,
   wherein when the collision determining unit determines that the item and the second object have collided, the action control unit acquires the first object identification information stored in association with the item identification information from the item/object storing unit and controls the second object to perform a first action against or toward the first object based on the first object identification information.

2. The object control device according to claim 1, further comprising:
   an operation-information acquiring unit configured to acquire an item possession instruction to instruct the first object to possess the item and an action instruction to instruct the first object to perform a second action using the item;
   a time counting unit configured to count an elapsed time from a timing based on the second action; and
   an item/object information management unit configured to erase the first object identification information and the item identification information, which are stored in association with each other in the item/object storing unit, when the elapsed time counted by the time counting unit becomes equal to or longer than a predetermined elapsed time.

3. The object control device according to claim 1, further comprising:
   an item-information storing unit configured to store mass information indicating a mass of the item, size information indicating a size of the item, and item positional information indicating a position of the item in association with the item identification information; and
   a physical computation unit configured to compute positional information of the item for each predetermined period after the second action is performed, based on the mass information, the size information, and the item positional information.

4. The object control device according to claim 1, further comprising positional-information acquiring unit configured to acquire positional information indicating a position of the first object, positional information indicating a position of the second object, and positional information indicating a position of the item,
   wherein the collision determining unit determines whether the second object and the item have collided based on the positional information of the second object and the positional information of the item, which are acquired by the positional-information acquiring unit.

5. The object control device according to claim 4, further comprising possession determining unit configured to determine whether the first object is able to possess the item based on the positional information of the first object and the positional information of the item, which are acquired by the positional-information acquiring unit, wherein the action control unit controls the first object to perform an action of possessing the item when the possession determining unit determines that the first object is able to possess the item.

6. A non-transitory computer-readable recording medium having an object control program stored thereon for causing a computer to function as:

an action control unit configured to control an action of a first object, an action of a second object, and an action of an item in a virtual space;

an item/object storing unit configured to store first object identification information for identifying the first object and item identification information for identifying the item in association with each other, when the action control unit controls the first object to possess the item; and a collision determining unit configured to determine whether the item and the second object have collided in the virtual space, wherein when the collision determining unit determines that the item and the second object have collided, the action control unit acquires the first object identification information stored in association with the item identification information from the item/object storing unit and controls the second object to perform a first action against or toward the first object based on the first object identification information.

7. An object control method, comprising:

controlling an action of a first object, an action of a second object, and an action of an item in a virtual space;

storing first object identification information for identifying the first object and item identification information for identifying the item in association with each other, when the first object is controlled to possess the item;

determining whether the item and the second object have collided in the virtual space; and when it is determined that the item and the second object have collided, acquiring the first object identification information stored in association with the item identification information and controlling the second object to perform a predetermined action against or toward the first object based on the first object identification information.

8. The object control device according to claim 1, wherein the first action is an attack against the first object.

9. The object control device according to claim 1, wherein the first action is a positional movement of the second object toward the first object.

10. The object control device according to claim 1, wherein the first action is selected based upon the item identification information and the first object identification information.

11. The object control device according to claim 1, wherein the first object is controlled by a user using an input device and the second object is controlled by the object control device.

* * * * *